United States Patent Office.

JOHN P. COWING, OF SENECA FALLS, NEW YORK.

*Letters Patent No.* 62,115, *dated February* 19, 1867; *reissue No.* 2,524, *dated March* 26, 1867.

IMPROVED COMPOSITION FOR ROOFING.

The Schedule referred to in these Letters Patent and making part of the same.

TO ALL WHOM IT MAY CONCERN:

Be it known that I, JOHN P. COWING, of Seneca Falls, Seneca county, State of New York, have invented a new and useful Compound for Plastic Roofing; and I do hereby declare that the following is a full and exact description thereof.

The nature of my invention consists of compounding coal tar and ground fire-clay rock or slaty clay, such as underlies (and sometimes overlies) the coal beds of Pennsylvania, and other States, particularly in the Fall Brook and Blossburg mines, where it has been used for the manufacture of fire-brick, and the same material, when ground, sold for making pots for melting glass.

My mode of using the same is to put the coal tar in a sheet-iron box made for the purpose, or in a common kettle or cauldron of sufficient size, and heat the same quite hot, then add the ground fire-clay flour by mixing the same thick or thin, as desired. I have found the best proportion to be about two-fifths ($\frac{2}{5}$) of fire-clay to three-fifths ($\frac{3}{5}$) of coal tar. It may also be mixed and used cold, but I prefer to use it hot, as it amalgamates more perfectly with the fire-clay, and will spread easier and adhere better to the material to which it is applied. I apply it to tin, wood, felt, paper, cloth, or other substances, with a trowel, brush, or any suitable tool.

The advantage of my compound is, that it is softer than the common slate-rock compound patented February 21, 1865, which article I disclaim as too hard and more liable to crack and cleave, and does not amalgamate and work as smoothly as the fire-clay. Also, I find mine is more sure as a protection against fire, as heat will not crack or flake it when put on wood or metal. I also disclaim the use of common clay pulverized, as patented July 17, 1866, as my fire-clay rock is much harder, and, being a fire-clay, has the quality of resisting a great amount of heat.

What I claim as my invention, and desire to secure by Letters Patent, is—

The simple compound of ground fire-clay rock, or slaty clay and coal tar, as specified.

JOHN P. COWING.

Witnesses:

A. P. THAYER,

T. P. SIMPSON.